United States Patent
Yuyama et al.

(10) Patent No.: US 7,746,405 B2
(45) Date of Patent: Jun. 29, 2010

(54) ILLUMINATION APPARATUS, IMAGING APPARATUS AND IRRADIATION METHOD FOR AN IMAGING APPARATUS COMPRISING LIGHT EMITTING DIODES WHICH ARE DUTY-DRIVEN DURING AN IMAGING PERIOD OF A FRAME PERIOD

(75) Inventors: Masami Yuyama, Ome (JP); Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 1008 days.

(21) Appl. No.: 11/167,546

(22) Filed: Jun. 27, 2005

(65) Prior Publication Data

US 2005/0231633 A1 Oct. 20, 2005

(30) Foreign Application Priority Data

Dec. 27, 2002 (JP) ............................. 2002-381364

(51) Int. Cl.
*H04N 5/222* (2006.01)
*H04N 5/235* (2006.01)

(52) U.S. Cl. ...................... 348/370; 348/68; 348/221.1

(58) Field of Classification Search ................. 348/370; 396/106, 109, 182, 191
See application file for complete search history.

(56) References Cited

U.S. PATENT DOCUMENTS

| | | | |
|---|---|---|---|
| 5,010,412 A | | 4/1991 | Garriss |
| 6,495,964 B1 * | | 12/2002 | Muthu et al. ................. 315/149 |
| 6,822,687 B1 * | | 11/2004 | Kakiuchi et al. ............. 348/348 |
| 7,071,979 B1 * | | 7/2006 | Ohtani et al. ................ 348/269 |
| 7,106,378 B2 * | | 9/2006 | Kawakami .................. 348/371 |

(Continued)

FOREIGN PATENT DOCUMENTS

DE 40 11 842 A1 10/1991

(Continued)

OTHER PUBLICATIONS

Communication pursuant to Article 96(2) issued by the European Patent Office in connection with counterpart European Patent Application Serial No. 03 768 310.9-2202, dated Oct. 12, 2005, 4 pages.

(Continued)

*Primary Examiner*—Ngoc-Yen T Vu
(74) *Attorney, Agent, or Firm*—Frishauf, Holtz, Goodman & Chick, P.C.

(57) ABSTRACT

There is provided an illumination apparatus used for imaging a moving picture made up of a plurality of frames, and for irradiating an auxiliary light from a light source constituted by one or a plurality of LEDs onto a photo-object. The one or plurality of LEDs are duty-driven by a duty ratio smaller than 100% during an imaging period (during a period for exposing a CCD) of a frame period. The heat releasing effect and the light emitting efficiency can be improved as compared to a case where the LEDs are successively turned on during an imaging period. As a result, the light emitting intensity at the time the light emitting diodes are turned on can be heightened with the amount of consumed electricity unchanged, and the light emitting efficiency of the light emitting diodes can be improved.

9 Claims, 7 Drawing Sheets

U.S. PATENT DOCUMENTS

| | | | |
|---|---|---|---|
| 7,202,902 B2 | 4/2007 | Miura et al. | |
| 7,400,826 B2 * | 7/2008 | Helbing et al. | 396/164 |
| 2002/0191102 A1 * | 12/2002 | Yuyama et al. | 348/370 |
| 2003/0052992 A1 * | 3/2003 | Nakata | 348/371 |
| 2005/0089322 A1 * | 4/2005 | Uenaka | 396/157 |

FOREIGN PATENT DOCUMENTS

| | | | |
|---|---|---|---|
| JP | 05-219447 A | | 8/1993 |
| JP | 5-328210 A | | 12/1993 |
| JP | 05328210 A | * | 12/1993 |
| JP | 2000-115685 A | | 4/2000 |
| JP | 2001-215579 A | | 8/2001 |
| JP | 2002-116481 A | | 4/2002 |
| JP | 2002-118788 A | | 4/2002 |
| WO | WO 02/098141 A2 | | 12/2002 |

OTHER PUBLICATIONS

Communication pursuant to Article 96(2) issued by the European Patent Office in connection with the counterpart European Patent Application Serial No. 03 768 310.9-2202, dated Jun. 28, 2006.

Japanese Office Action (and English translation thereof) dated Jun. 24, 2008, issued in a counterpart Japanese Application.

* cited by examiner

ILLUMINATION APPARATUS, IMAGING APPARATUS AND IRRADIATION METHOD FOR AN IMAGING APPARATUS COMPRISING LIGHT EMITTING DIODES WHICH ARE DUTY-DRIVEN DURING AN IMAGING PERIOD OF A FRAME PERIOD

This application is a Continuation Application under 35 USC 371 of International Application No. PCT/JP2003/16883 filed Dec. 26, 2003.

BACKGROUND OF THE INVENTION

1. Field of the Invention

The present invention relates to an illumination apparatus and an imaging apparatus.

2. Description of the Related Art

Recently, a digital camera imaging a photo-object by an image pickup device such as a CCD (Charge Coupled Device), and storing the image of the photo-object in various recording media, has a function for taking a moving picture, in addition to a function of taking a still picture. As a format for storing a moving picture, a MJPEG (Motion Joint Photographic Experts Group) format is frequently employed. According to the MJPEG format, a photo-object is imaged successively, for example, once in every 33 msecs by exposing the image pickup device in accordance with a certain frame rate, and a plurality of frames obtained by imaging the photo-object are compressed and stored.

Most digital cameras have a built-in strobe. It is not realizable that such a built-in strobe is used to secure exposure when taking a moving picture in such a way as described above. That is, a built-in strobe is so structured as to emit a strobe light (auxiliary light) by using a discharge tube such as a xenon lamp or the like as a light source and by causing the discharge tube to discharge by a high voltage current from a power source of the camera in which the built-in strobe is contained. With this strobe structure, one light emission time is short, and the amount of consumed electricity is too large to allow successive light emission. Hence, there arises an idea of using a light emitting diode (hereinafter referred to as LED) which consumes a less amount of electricity, in order to secure exposure when taking a moving picture (for example, see Unexamined Japanese Patent Application KOKAI Publication No. H5-328210).

SUMMARY OF THE INVENTION

However, an illumination apparatus utilizing an LED as a light source as described above has a problem. That is, if one tries to increase the amount of auxiliary light obtained from such an illumination apparatus, many LEDs are required, and the amount of consumed electricity increases in accordance with the increase in the number of LEDs.

The present invention was made in view of the above circumstance, and an object of the present invention is therefore to provide an illumination apparatus, imaging apparatus and irradiation method with a light source structure constituted by a light emitting diode, wherein the amount of auxiliary light can be increased without increasing the amount of consumed electricity.

To achieve the above object, an illumination apparatus according to a first aspect of the present invention is an illumination apparatus which is used for taking a moving picture made up of a plurality of frames and for irradiating an auxiliary light from a light source constituted by light emitting diodes onto a photo-object, and comprises a driver which duty-drives the light emitting diodes during an imaging period of a frame period.

The illumination apparatus may comprise a plurality of the light emitting diodes, and the driver may duty-drive the plurality of light emitting diodes by sequentially switching the light emitting diodes to be driven every imaging-period.

The plurality of light emitting diodes may emit lights having different colors from one another.

An illumination apparatus according to a second aspect of the present invention is an illumination apparatus which is used for taking a moving picture made up of a plurality of frames and for irradiating an auxiliary light from a light source constituted by light emitting diodes onto a photo-object, and comprises a plurality of the light emitting diodes, and a driver which drives the plurality of light emitting diodes by sequentially switching the light emitting diodes to be driven during a same imaging period of a frame period.

The driver may control driving of the plurality of light emitting diodes by unit of a light emitting diode group including some of the plurality of light emitting diodes, and drive the plurality of light emitting diodes by sequentially switching light emitting diode groups to be driven during a same imaging period of a frame period.

An illumination apparatus according to a third aspect of the present invention is an illumination apparatus which is used for taking a moving picture made up of a plurality of frames and for irradiating an auxiliary light from a light source constituted by light emitting diodes onto a photo-object, and comprises a plurality of the light emitting diodes, and a driver sequentially drives the plurality of light emitting diodes by synchronizing periods for driving the light emitting diodes during a same imaging period of a frame period.

The driver may control driving of the plurality of light emitting diodes in unit of a light emitting diode group including some of the plurality of light emitting diodes, and sequentially drive light emitting diode groups by synchronizing periods for driving the light emitting diode groups during a same imaging period of a frame period.

The driver may drive the light emitting diodes by a drive current having a value which is preset in accordance with a duty ratio for driving the light emitting diodes.

An imaging apparatus according to a fourth aspect of the present invention is an imaging apparatus which has an image pickup device for imaging a photo-object and a function for imaging a moving picture made up of a plurality of frames, and comprises light emitting diodes which are a light source of an auxiliary light to be irradiated onto a photo-object, and a driver which duty-drives the light emitting diodes during an imaging period of a frame period.

The imaging apparatus may comprise a plurality of the light emitting diodes, and the driver may duty-drive the plurality of light emitting diodes by sequentially switching the light emitting diodes to be driven every imaging-period.

The plurality of light emitting diodes may emit lights having different colors from one another.

An imaging apparatus according to a fifth aspect of the present invention is an imaging apparatus which has an image pickup device for imaging a photo-object and a function for imaging a moving picture made up of a plurality of frames, and comprises a plurality of light emitting diodes which are a light source of an auxiliary light to be irradiated onto a photo-object, and a driver drives the plurality of light emitting diodes by sequentially switching the light emitting diodes to be driven during a same imaging period of a frame period.

The driver may control driving of the plurality of light emitting diodes by unit of a light emitting diode group including some of the plurality of light emitting diodes, and drive the plurality of light emitting diodes by sequentially switching light emitting diode groups to be driven during a same imaging period of a frame period.

An imaging apparatus according to a sixth aspect of the present invention is an imaging apparatus which has an image pickup device for imaging a photo-object and a function for taking a moving picture made up of a plurality of frames, and comprises a plurality of light emitting diodes which are a light source of an auxiliary light to be irradiated onto a photo-object, and a driver sequentially drives the plurality of light emitting diodes by synchronizing periods for driving the light emitting diodes during a same imaging period of a frame period.

The driver may control driving of the plurality of light emitting diodes by unit of a light emitting diode group including some of the plurality of light emitting diodes, and drive the plurality of light emitting diodes by sequentially switching light emitting diode groups to be driven during a same imaging period of a frame period.

The driver may drive the light emitting diodes by a drive current having a value which is preset in accordance with a duty ratio for driving the light emitting diodes.

An illumination apparatus according to a seventh aspect of the present invention is an illumination apparatus which is used for taking a moving picture made up of a plurality of frames and for irradiating an auxiliary light from a light source constituted by light emitting diodes onto a photo-object, and comprises drive means which duty-drives the light emitting diodes during an imaging period of a frame period.

An irradiation method according to an eighth aspect of the present invention is a method which is used for taking a moving picture made up of a plurality of frames and for irradiating an auxiliary light from a light source constituted by light emitting diodes onto a photo-object, and comprises duty-driving the light emitting diodes during an imaging period of a frame period.

The irradiation method may use a plurality of the light emitting diodes and further comprise sequentially switching the light emitting diodes to be driven every imaging period of a frame period, and duty-driving the light emitting diodes that are now in turn to be driven by being switched.

According to a ninth aspect of the present invention, there is provided a computer-readable recording medium which stores a program for a computer of an imaging apparatus used for taking a moving picture made up a plurality of frames and for irradiating an auxiliary light from a light source constituted by light emitting diodes onto a photo-object, the program controlling the computer to duty-drive the light emitting diodes during an imaging period of a frame period.

The imaging apparatus comprises a plurality of the light emitting diodes; and the program controls said computer to; sequentially switch the light emitting diodes to be driven every imaging period of a frame period; and duty-drive the light emitting diodes that are now in turn to be driven by being switched.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiments of the present invention will now be explained with reference to the drawings.

First Embodiment

Figure 1:
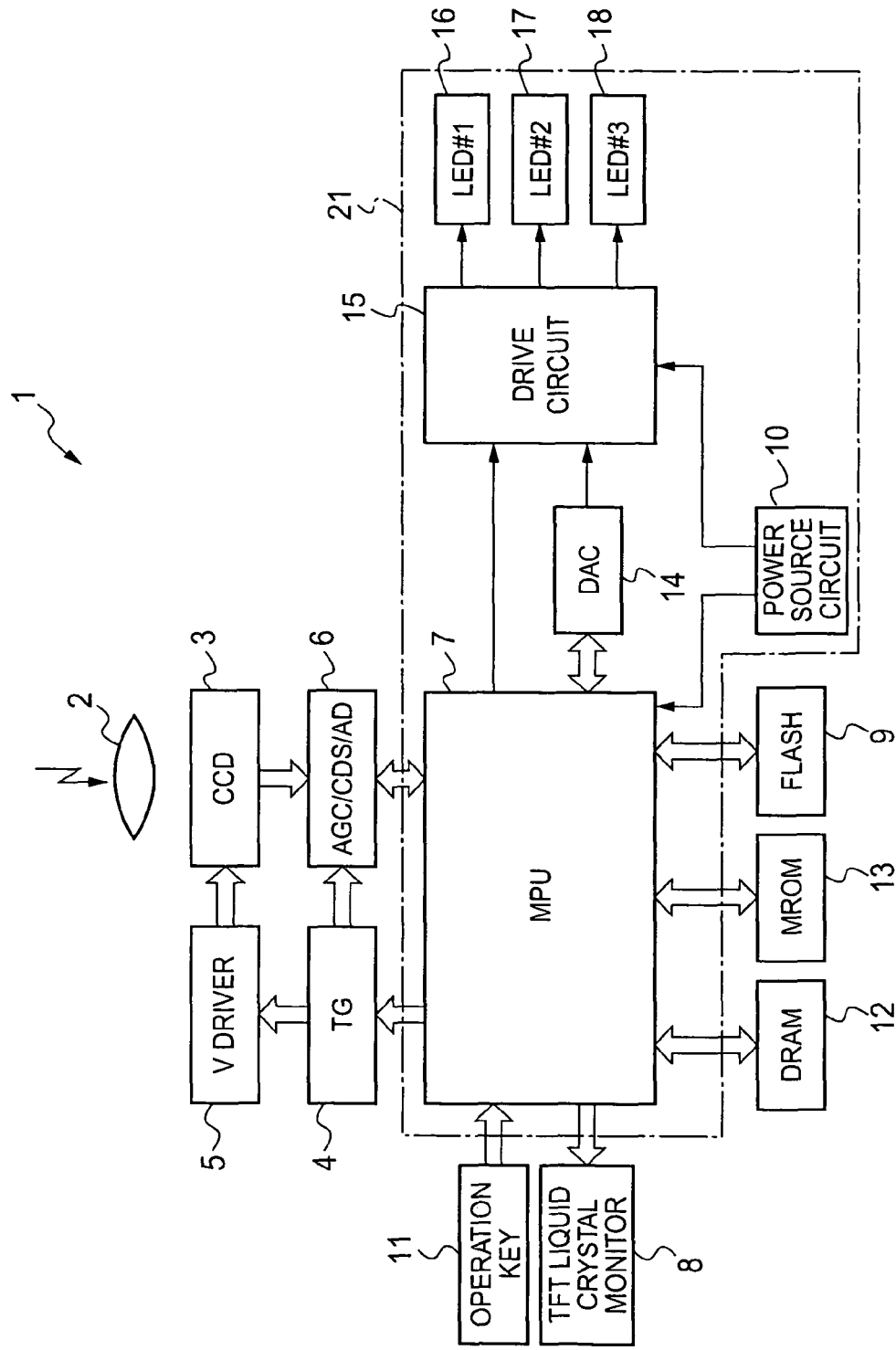
FIG. 1 is a block diagram of an electronic still camera which is common in the embodiments of the present invention.

FIG. 1 is a block diagram showing a structure of an electronic still camera according to a first embodiment of the present invention.

As shown in FIG. 1, the electronic still camera 1 comprises a photographing lens 2, a CCD (Charge Coupled Device) 3, a TG (Timing Generator) 4, a V (Vertical) driver 5, a unit circuit 6, an MPU (Micro Processing Unit) 7, a TFT (Thin Film Transistor) liquid crystal monitor 8, a flash memory 9, a power source circuit 10, an operation key unit 11, a DRAM (Dynamic Random Access Memory) 12, an MROM (Mask Read Only Memory) 13, a D/A (Digital/Analog) converter 14, a drive circuit 15, and first to third LEDs (Light Emitting Diodes) 16 to 18. Among these, the MPU 7, the power source circuit 10, the D/A converter 14, the drive circuit 15, and the first to third LEDs 16 to 18 constitute an illumination apparatus 21.

In addition to a function of taking a still picture, the electronic still camera 1 has a function of taking a moving picture. The electronic still camera 1 employs a MJPEG (Motion Joint Photographic Experts Group), images a photo-object by exposing the CCD3 in accordance with a certain frame rate. The electronic still camera 1 compresses and stores a plurality of frames obtained by imaging the photo-object.

The CCD 3 converts an optical image (photo-object image) of the photo-object which is formed via the photographing lens 2 into an electric charge having a level corresponding to the brightness of the optical image, and stores the obtained electric charge. The CCD 3 supplies the stored electric charge to the unit circuit 6 as an imaging signal, in response to a read pulse input from the V driver 5. The CCD3 functions as an electric shutter, by its electric charge storing period being changed by the TG4 and V driver 5 in according with a shutter pulse sent from an MPU 7.

The TG 4 generates a timing pulse under the control of the MPU 7. The V driver 5 generates a read pulse based on a timing pulse input from the TG 4, and outputs the generated read pulse to the CCD 3, thereby driving the CCD 3.

The unit circuit 6 includes a CDS (Correlation Doubleness Sampling) circuit, an AGC (Automatic Gain Control) amplifier, and an AID (Analog/Digital) converter. The CDS circuit applies a correlation doubleness sampling processing to an imaging signal supplied from the CCD 3 to remove a noise component contained in the imaging signal. The AGC amplifier amplifies the imaging signal output from the CDS circuit to a predetermined level. The A/D converter A/D-converts the imaging signal input from the AGC amplifier, and supplies it to the MPU 7.

The MPU 7 exerts a signal processing function, an image processing function, etc. by executing a signal processing program, an image processing program, etc. stored in the MROM 13. The MPU 7 generates a video signal from the imaging signal supplied from the unit circuit 6, and supplies the generated video signal to the TFT liquid crystal monitor 8. The photo-object image is displayed on the TFT liquid crystal monitor 8 as a through-image. At the time of photographing, the MPU 7 compresses the imaging signal, and thereby generates an image file of a predetermined format. Then, the MPU 7 stores the image file in the flash memory 9. The MPU 7 expands the image file in the DRAM 12, and displays a still picture or a moving picture on the TFT liquid crystal monitor 8. The MPU 7 generates a light intensity control signal for controlling an amount of auxiliary light to be generated by the first to third LEDs 16 to 18 from the photographing signal, and supplies the light intensity control signal to the D/A converter 14. The MPU 7 supplies the drive circuit 15 with an image start timing signal representing the timing at which the CCD 3 starts imaging the photo-object and an image end timing signal representing the timing at which the CCD 3 ends the imaging, based on the imaging signal supplied from the unit circuit 6.

The power source circuit 10 is constituted by comprising a battery, etc. not illustrated, and applies a voltage to the MPU 7 and to the drive circuit 15. The operation key unit 11 is constituted by comprising various switches such as a shutter key, etc. The DRAM 12 functions as a work memory. The MROM 13 stores programs to be executed by the MPU 7, such as the signal processing program, the image processing program, etc. The D/A converter 14 D/A-converts a light intensity control signal supplied from the MPU 7, and supplies it to the drive circuit 15.

The drive circuit 15 supplies a drive current of a predetermined duty ratio (equal to or smaller than 100%) to the first to third LEDs 16 to 18 in response to an image start timing signal supplied from the MPU 7. Then, the drive circuit 15 stops supplying the drive current to the first to third LEDs 16 to 18 in response to an image end timing signal supplied from the MPU 7. In this manner, the drive circuit 15 duty-drives the first to third LEDs 16 to 18 in synchronization with a period (imaging period) during which the CCD 3 is actually imaging the photo-object, in other words a period (exposure period) during which the CCD3 is exposed, of a frame period. The drive circuit 15 supplies the first to third LEDs 16 to 18 with a drive current having a level which is preset correspondingly to the level (voltage value) of a light intensity control signal (direct current voltage signal) supplied from the D/A converter 14 and the duty ratio for driving the first to third LEDs 16 to 18. Due to this, the drive circuit 15 can irradiate an auxiliary light in a desired light intensity onto the photo-object.

The first to third LEDs 16 to 18 emit a white emission light. By being duty-driven by the drive circuit 15, the first to third LEDs 16 to 18 emit a light intermittently, thereby irradiate an auxiliary light onto the photo-object.

Figure 2:
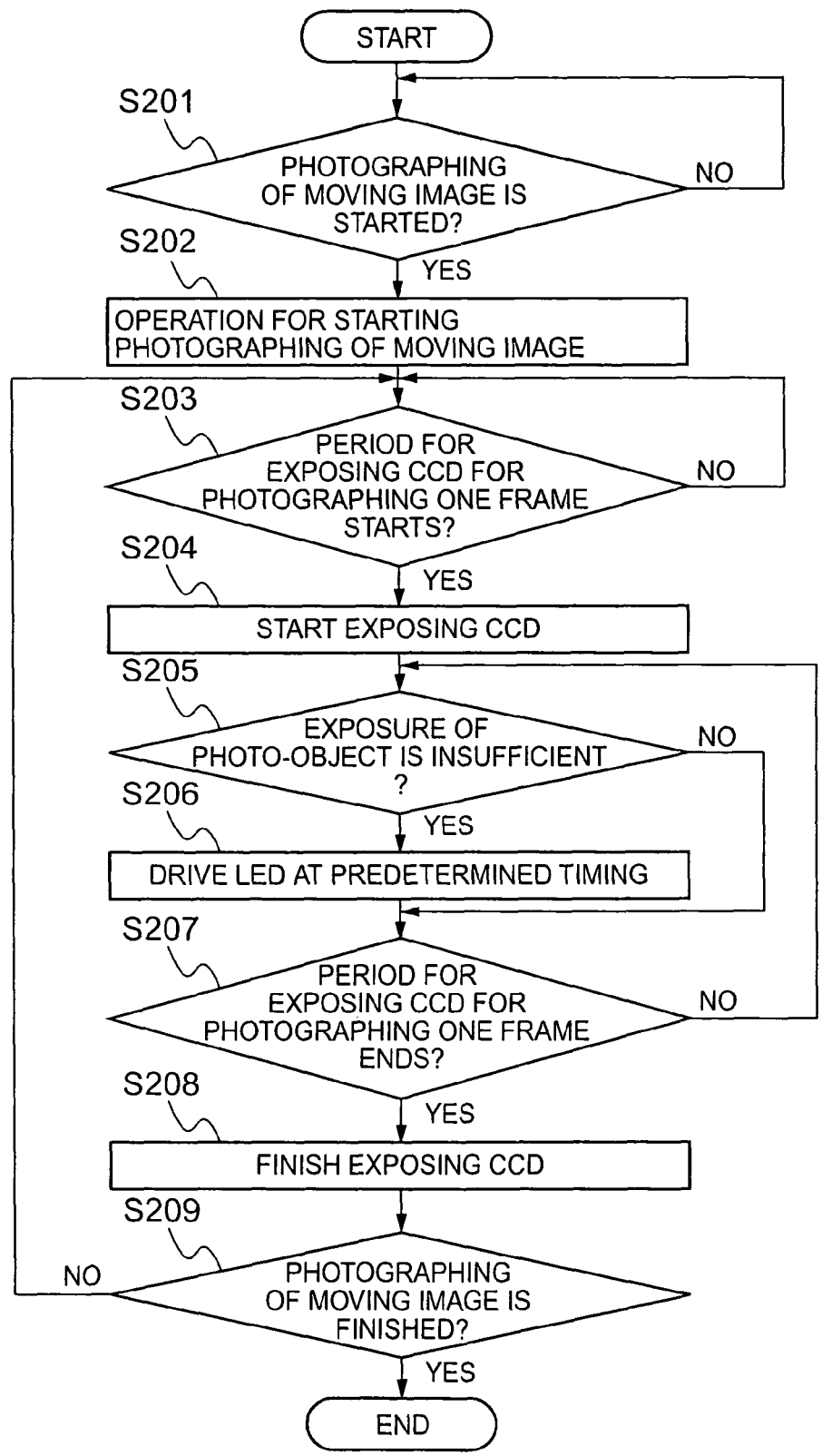
FIG. 2 is a main flowchart showing a moving picture taking operation of an electronic still camera, which operation is common to the respective embodiments of the present invention.

FIG. 2 is a main flowchart showing an operation of taking a moving 10 picture performed by the electronic still camera 1, which is the imaging apparatus of the present invention. Each process shown in this flowchart is performed by a program stored in the MROM 13 or the like being read by the MPU 7 which is the main control circuit.

First, the electronic still camera 1 waits for an instruction for starting 15 taking a moving picture to be given by a user via a shutter key or the like (step S201). Until such an instruction for starting taking a moving picture is given, the electronic still camera 1 is looping in step S201. When start of taking a moving picture is instructed (step S201: Yes), the electronic still camera 1 performs various initialization processes such as securing of storage area for taken picture data, and initialization of an AF (Automatic Focus) lens position, etc., and start taking a moving picture (step S202).

While a moving picture is taken, the electronic still camera 1 repeatedly performs processes of steps S203 to S209. First, the MPU 7 determines whether it is the timing for exposing the CCD 3 in order to take a picture corresponding to one frame of the moving picture (step S203), and waits until the timing for exposing the CCD 3 comes by looping in step S203 (step S203: No). When the timing for starting exposing the CCD 3 comes (step S203: Yes), the MPU 7 starts exposing the CCD 3 (step S204) and performs the following steps while performing exposure.

The MPU 7 determines in step S205 whether exposure of the photo-object is insufficient or not. In a case where determining that exposure of the photo-object is insufficient, that is, the photo-object lacks in light amount and is dark (step S205: Yes), the MPU 7 drives the LEDs at predetermined timings shown in the timing charts (see FIG. 3, FIGS. 5 to 7) to be explained in the respective embodiments of the present invention (step S206). On the contrary, in a case where determining that exposure of the photo-object is sufficient (step S205: No), the MPU 7 skips the process of step S206.

Here, an example wherein the process of determining whether exposure of the photo-object is insufficient is performed while the CCD 3 is exposed has been shown. However, different process flows may be employable. For example, in a case where the MPU 7 performs determination once for every CCD exposing period for taking one frame, the MPU 7 may perform determination on the brightness of the photo-object before step S204 and set a flag such as an LED drive flag or the like in a case where exposure of the photo-object is insufficient. Then in step S205, the MPU 7 may determine whether to drive the LEDs, based on the LED drive flag. Further, the MPU 7 may employ a method where it performs determination on whether to drive the LEDs only once for each taking of a moving picture. In this case, the MPU 7 may perform determination on whether the exposure of the photo-object is insufficient before, for example, step S202, and store the determination result by a flag.

The MPU 7 repeats the processes of step S205 and step S206 until the timing at which the exposing period for taking one frame of a moving picture ends. Specifically, the MPU 7 determines in step S207 whether the timing at which the CCD exposing period for taking one frame of a moving picture ends comes or not, and returns to step S205 to perform the loop process unless the exposing period ends (step S207: No).

When the exposing period ends (step S207: Yes), the MPU 7 finishes exposure of the CCD 3(step S208), and applies image processing, compression processing, etc. to the obtained images and store them. The explanation for the image processing and storing processing is omitted herein, because they are publicly well-known techniques.

The MPU 7 loops back to step S203 to repeat the processes from step S203, unless taking of the moving picture is finished (step S209: No). On the contrary, when an instruction for finishing taking a moving picture is given by the user by, for example, pushing a shutter key (step S209: Yes), the operation of taking a moving picture according to the present invention is completed.

Figure 3:
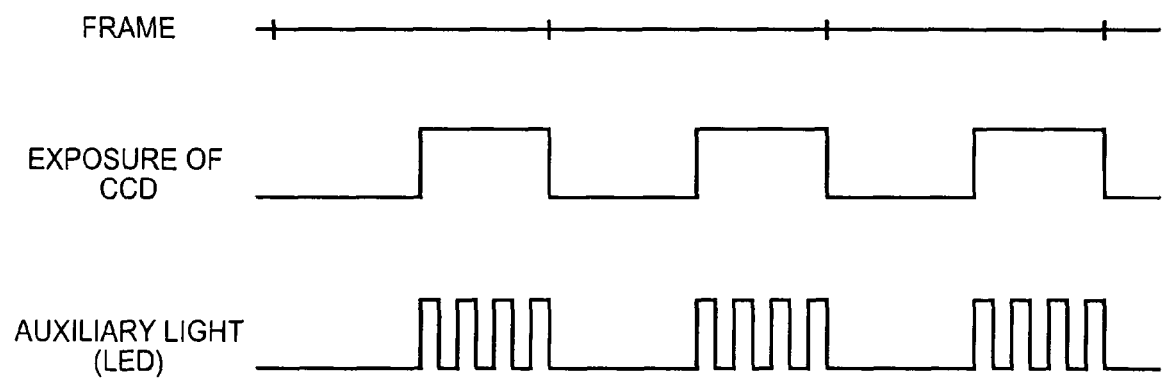
FIG. 3 shows timing charts of an operation of a drive circuit according to a first embodiment of the present invention.

Next, the operation of the drive circuit when taking a moving picture will be explained with reference to timing charts shown in FIG. 3.

When imaging of a photo-object by the CCD 3 is started, an image start timing signal is supplied to the drive circuit 15 from the MPU 7. In response to this imaging start timing signal, the drive circuit 15 supplies a drive current having a level corresponding to the level of a light intensity control signal and the duty ratio to the first to third LEDs 16 to 18, thereby duty-driving the first to third LEDs 16 to 18. When imaging of the photo-object by the CCD 3 is finished, an image end timing signal is supplied to the drive circuit 15 from the MPU 7. In response to the imaging end timing signal, the drive circuit 15 stops supplying the drive current to the first to third LEDs 16 to 18 to stop driving of the first to third LEDs 16 to 18. As a result, as shown in FIG. 3, the drive circuit 15 can drive the first to third LEDs 16 to 18 to emit a light intermittently in synchronization with an imaging period (exposure period) of a frame period.

The present invention is not limited to the above-described embodiment, but can be modified or applied in various ways. Modifications of the above-described embodiment which can be applied to the present invention will now be explained.

In the above-described embodiment, the drive circuit 15 duty-drives the first to third LEDs 16 to 18 only during the imaging period (exposure period) of the CCD 3. The present invention is not limited to this, but the drive circuit 15 may duty-drive the first to third LEDs 16 to 18 throughout the period during which taking of a moving picture is performed.

In the above-described embodiment, the electronic still camera 1 comprises three LEDs. However, the present invention is not limited to this, but the number of LEDs comprised in the electronic still camera 1 may be arbitrary for example, one or equal to or more than four.

Figure 4:
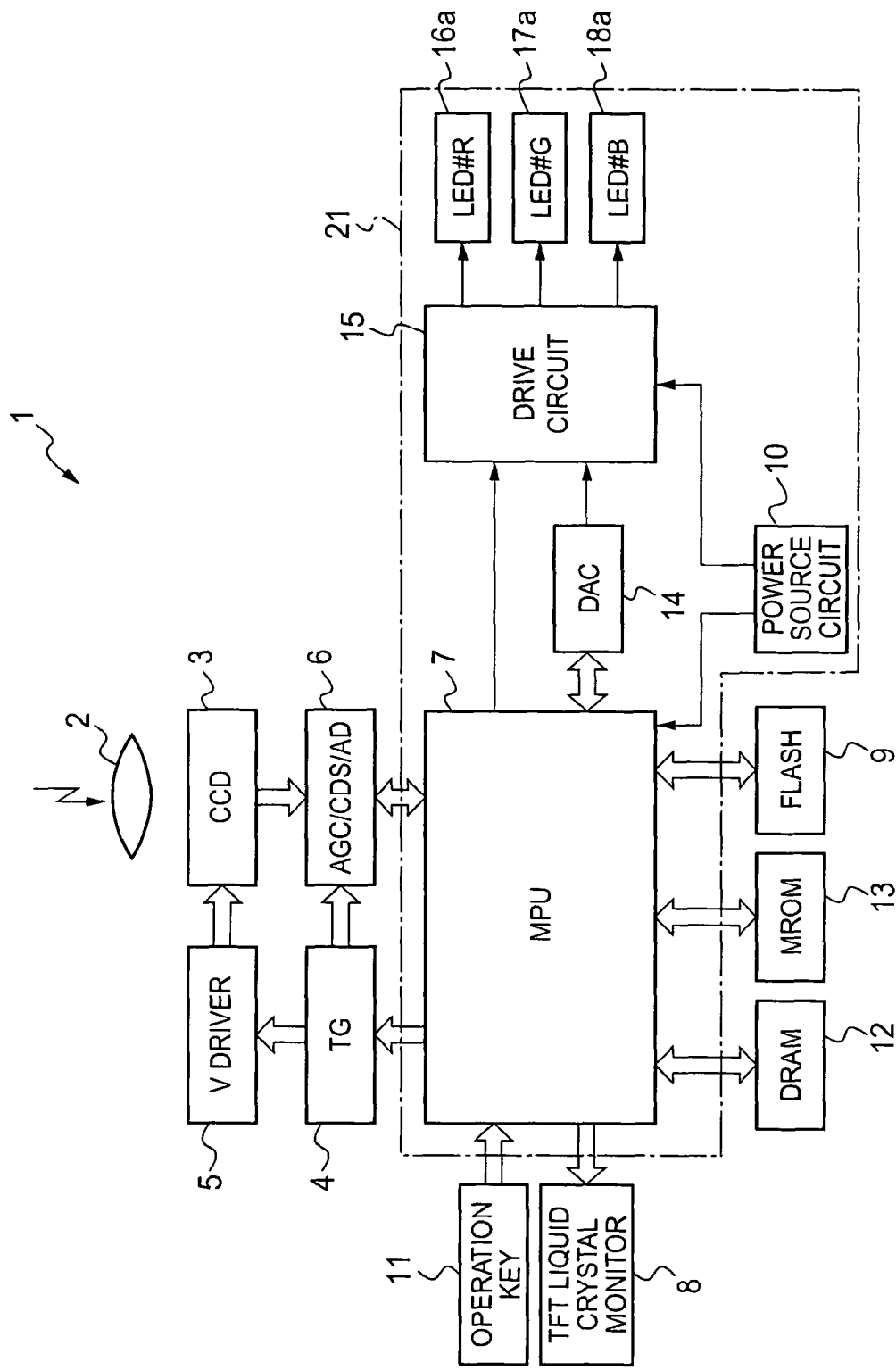
FIG. 4 is a block diagram of an electronic still camera of a case where LEDs emitting lights having different colors are used to carry out the present invention, which case is common to the respective embodiments of the present invention.

Further, in the above-described embodiment, the color of the light emitted by the first to third LEDs 16 to 18 is white. However, the present invention is not limited to this, but the first to third LEDs 16 to 18 may emit lights having different colors. The first to third LEDs 16 to 18 may be replaced with three LEDs (for example, LEDs 16a, 17a, and 18a shown in FIG. 4) having different light emission colors (for example, R, G, and B shown in FIG. 4) Furthermore, the color of the light may be changed frame by frame.

Second Embodiment

A second embodiment of the present invention will now be explained with reference to timing charts shown in FIG. 5.

Figure 5:
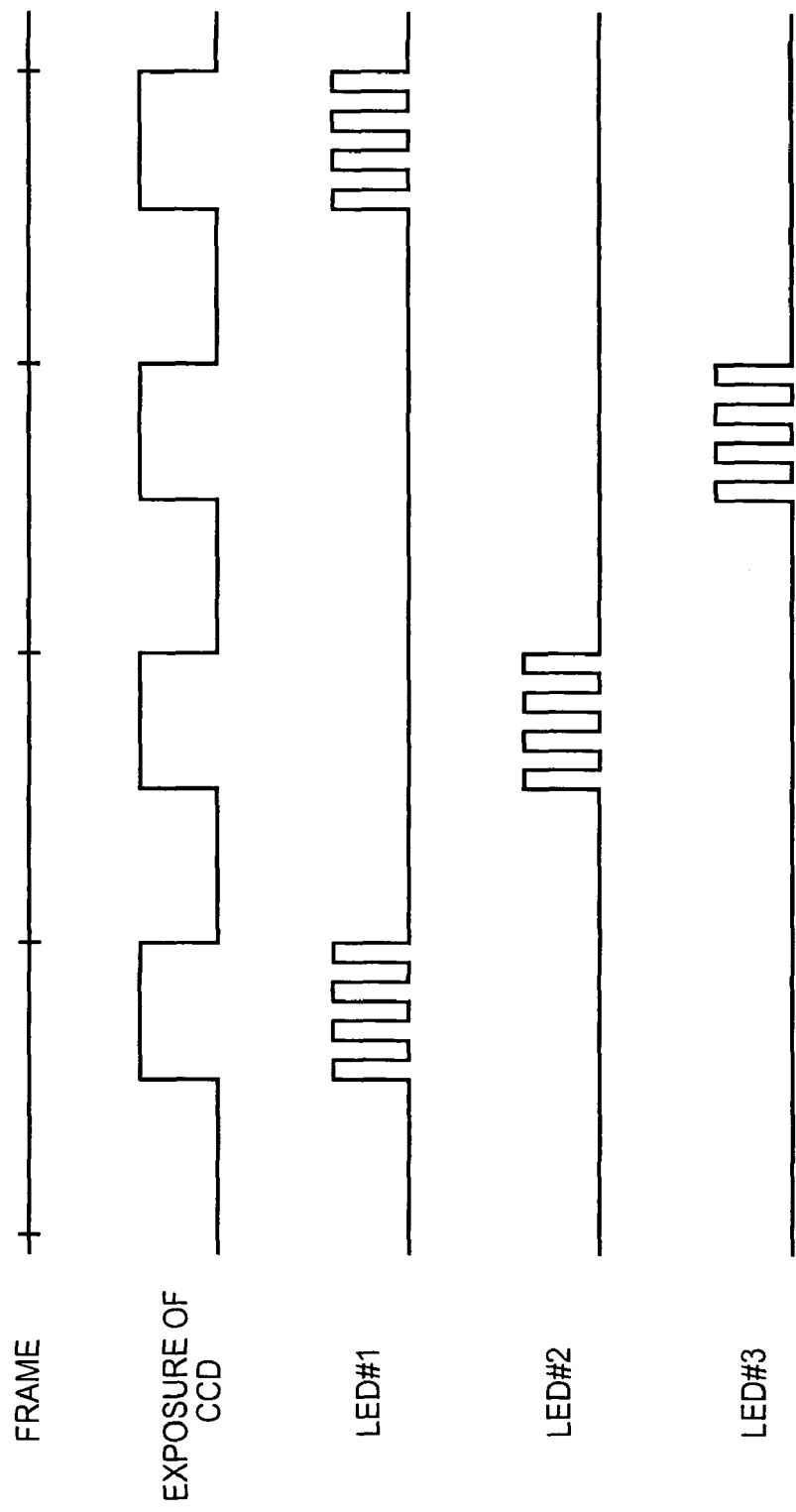
FIG. 5 shows timing charts of an operation of a drive circuit according to a second embodiment of the present invention.

According to the second embodiment, within one frame period, the drive circuit 15 duty-drives only one of the first to third LEDs 16 to 18 during a photographing period as shown in FIG. 5, and sequentially switches the LEDs to be driven frame by frame, for example, in the order of the first LED 16, the second LED 17, and the third LED 18. In this case, the drive circuit 15 sequentially switches the LEDs to be driven in response to an image start timing signal and an image end timing signal supplied from the MPU 7.

The present invention is not limited to the above-described embodiment, but can be modified and applied in various ways. Modifications of the above-described embodiment which can be applied to the present invention will now be explained.

In the above-described embodiment, the drive circuit 15 is connected to three LEDs (first to third LEDs 16 to 18). However, the present invention is not limited to this, but the number of LEDs connected to the drive circuit 15 may be arbitrary.

In the above-described embodiment, the drive circuit 15 sequentially switches the first to third LEDs 16 to 18 frame by frame and duty-drives one of them during the imaging period (exposure period). However, the present invention is not limited to this, but the drive circuit 15 may drive a plurality of LEDs in one frame period and switch the LEDs sequentially frame by frame.

Further, also in the above-described embodiment, the colors of the lights emitted by the first to third LEDs 16 to 18 may be different. For example, the color of the light emitted by the first LED 16 may be red, the color of the light emitted by the second LED 17 may be green, and the color of the light emitted by the third LED 18 may be blue. Furthermore, the color of the light to be emitted may be changed frame by frame.

Third Embodiment

A third embodiment of the present invention will now be explained with reference to timing charts shown in FIG. 6.

Figure 6:
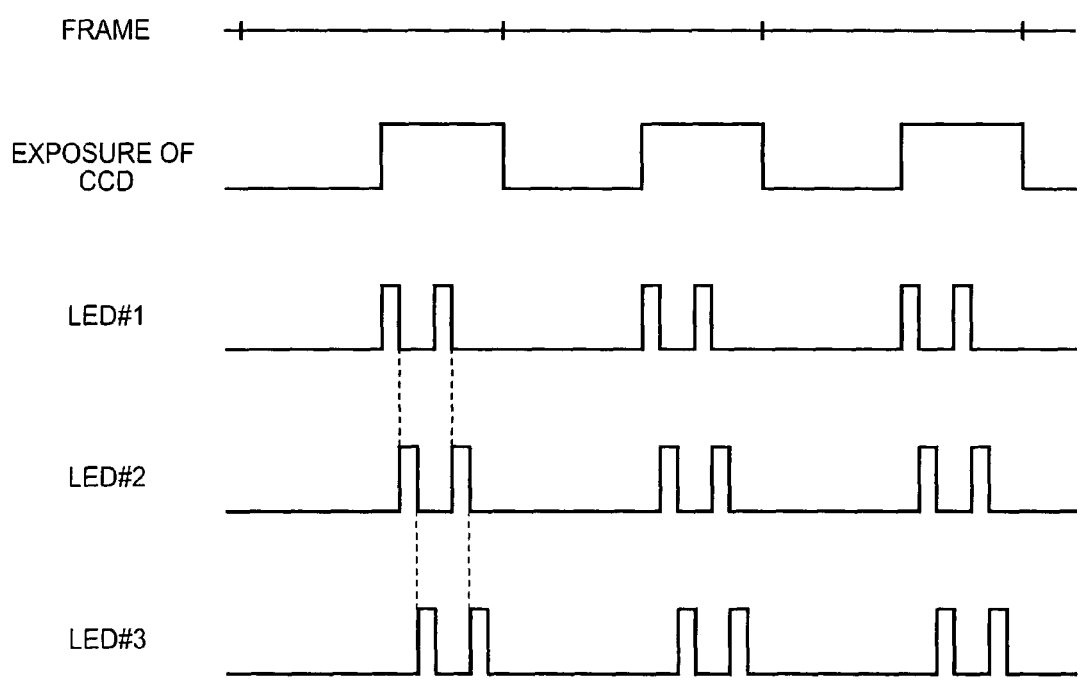
FIG. 6 shows timing charts of an operation of a drive circuit according to a third embodiment of the present invention.

According to the third embodiment, the drive circuit 15 drives the first to third LEDs 16 to 18 by switching the first to third LEDs 16 to 18 sequentially within one imaging period (exposure period), as shown in FIG. 6. In this case, the MPU 7 supplies a switch timing signal to the drive circuit 15 twice in one imaging period (exposure period), and the drive circuit 15 sequentially switches the LEDs to be driven in response to this switch timing signal.

The present invention is not limited to the above-described embodiment, but can be modified and applied in various ways. Modifications of the above-described embodiment which can be applied to the present invention will be explained below.

In the above-described embodiment, the drive circuit 15 drives each of the first to third LEDs 16 to 18 once in one imaging period (exposure period). However, the present invention is not limited to this, but the drive circuit 15 may drive each of the first to third LEDs 16 to 18 more than once in one imaging period(exposure period) by cyclically switching the-first-to third LEDs 16 to 18.

Also in the above-described embodiment, the drive circuit 15 may drive a plurality of LEDs in one frame period, and may sequentially switch the LEDs to be driven frame by frame.

Further, also in the above-described embodiment, the colors of the lights emitted by the first to third LEDs 16 to 18 may be different. For example, the color of the light emitted by the first LED 16 may be red, the color of the light emitted by the second LED 17 may be green, and the color of the light emitted by the third LED 18 may be blue. Furthermore, the color of the light to be emitted may be changed frame by frame.

Fourth Embodiment

A fourth embodiment of the present invention will now be explained with reference to timing charts shown in FIG. 7.

Figure 7:
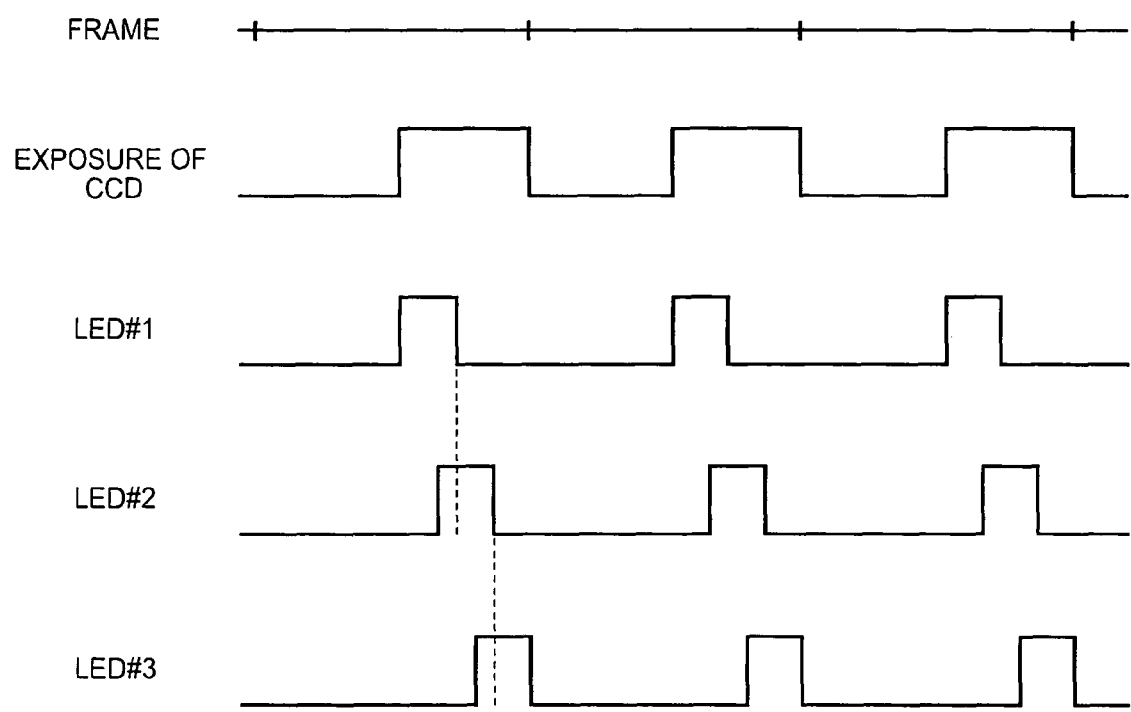
FIG. 7 shows timing charts of an operation of a drive circuit according to a fourth embodiment of the present invention.

According to the fourth embodiment, the drive circuit 15 drives the first to third LEDs 16 to 18 in one imaging period (exposure period) by partially synchronizing the periods for driving the respective LEDs, as shown in FIG. 7. In this case, the MPU 7 supplies a drive start timing signal and a drive end timing signal to the drive circuit 15 in a predetermined cycle. The cycle in which the drive start timing signal (or the drive end timing signal) is supplied to the drive circuit 15 is smaller than a time interval Tm from a timing at which the drive start timing signal is supplied until a timing at which the drive end timing signal is supplied. If it is assumed that the imaging period (exposure period) is T, a relationship T=2Ts+Tm is satisfied.

The present invention is not limited to the embodiments described so far, but can be modified and applied in various ways. Modifications of these embodiments which can be applied to the present invention will be explained below.

In the first to fourth embodiments, explanation has been made by employing an electronic still camera as an example. However, the present invention is not limited to an electronic still camera, but can be applied to any imaging apparatus if it has a function for taking a moving picture. For example, the present invention can be applied to a cellular phone with a camera, a PDA (Personal Digital Assistant) with a camera.

The first to fourth embodiments have been explained by employing a case where the function of a driver is realized by the drive circuit 15 as an example. However, the present invention is not limited to this example. Part of the function of the driver of the present invention may be realized by the MPU 7, or part of the function of the drive means of the present invention may be realized by the MPU 7 by reading and executing a program stored in the MROM 13.

In the first to fourth embodiments, explanation has been made by employing the illumination apparatus 21 which is built in the electronic still camera 1, as an example. However, the present invention is not limited to this type of illumination apparatus, but can be applied to an illumination apparatus which is separate from an electronic still camera. In this case, in order to irradiate an auxiliary light onto a photo-object during a imaging period (exposure period) of the CCD 3, it is necessary to prepare a system for supplying an image start timing signal, an image end timing signal, etc. from the electronic still camera to the illumination apparatus, such as by connecting the illumination apparatus to the electronic still camera.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-381364 filed on Dec. 27, 2002 and including specification, claims, drawings and summary. The disclosure of the above Japanese Patent Application is incorporated herein by reference in its entirety.

What is claimed is:

1. An illumination apparatus for taking a moving picture comprising a plurality of frames and for irradiating an auxiliary light onto a photo-object from a light source comprising a plurality of light emitting diodes, said illumination apparatus comprising:
   a driver which duty-drives said light emitting diodes during imaging periods of frame periods, each frame period comprising only one imaging period,
   wherein said driver duty-drives one light emitting diode of said plurality of light emitting diodes during the imaging period of a given frame period and sequentially switches said light emitting diodes to be driven every imaging period of different frame periods.

2. The illumination apparatus according to claim 1, wherein said plurality of light emitting diodes emit lights having different colors from one another.

3. The illumination apparatus according to claim 1, wherein said driver drives said light emitting diodes by a drive current having a value which is preset in accordance with a duty ratio for driving said light emitting diodes.

4. An imaging apparatus comprising:
   an image pickup device for imaging: (i) a photo-object, and (ii) a moving picture comprising a plurality of frames;
   a plurality of light emitting diodes which are a light source of an auxiliary light to be irradiated onto said photo-object; and
   a driver which duty-drives said light emitting diodes during imaging periods of frame periods, each frame period comprising only one imaging period,
   wherein said driver duty-drives one light emitting diode of said plurality of light emitting diodes during the imaging period of a given frame period and sequentially switches said light emitting diodes to be driven every imaging period of different frame periods.

5. The imaging apparatus according to claim 4, wherein said plurality of light emitting diodes emit lights having different colors from one another.

6. The imaging apparatus according to claim 4, herein said driver drives said light emitting diodes by a drive current having a value which is preset in accordance with a duty ratio for driving said light emitting diodes.

7. An illumination apparatus for taking a moving picture comprising a plurality of frames and for irradiating an auxiliary light onto a photo-object from a light source comprising a plurality of light emitting diodes, said illumination apparatus comprising:
   drive means for duty-driving said light emitting diodes during imaging periods of frame periods, each frame period comprising only one imaging period,
   wherein said drive means duty-drives one light emitting diode of said plurality of light emitting diodes during the imaging period of a given frame period, and sequentially switches said light emitting diodes to be driven every imaging period of different frame periods.

8. An irradiation method for taking a moving picture comprising a plurality of frames and for irradiating an auxiliary light onto a photo-object from a light source comprising a plurality of light emitting diodes, said method comprising:
   duty-driving said light emitting diodes during imaging periods of frame periods, each frame period comprising only one imaging period,
   wherein one light emitting diode of said plurality of light emitting diodes is duty-driven during the imaging period of a given frame period, and said plurality of light emitting diodes are sequentially switched to be driven every imaging period of different frame periods.

9. A computer-readable recording medium having a computer readable program stored thereon for a computer of an imaging apparatus for taking a moving picture comprising a plurality of frames, and for irradiating an auxiliary light onto a photo-object from a light source comprising a plurality of light emitting diodes, said program being executable by said computer to perform functions comprising:
   duty-driving said light emitting diodes during imaging periods of frame periods, each frame period comprising only one imaging period,
   wherein one light emitting diode of said plurality of light emitting diodes is duty-driven during the imaging period of a given frame period, and said plurality of light emitting diodes are sequentially switched to be driven every imaging period of different frame periods.

* * * * *